US008466631B1

(12) United States Patent
Rhodes et al.

(10) Patent No.: US 8,466,631 B1
(45) Date of Patent: Jun. 18, 2013

(54) LAMP DRIVER WITH TRIAC DIMMER COMPENSATION

(75) Inventors: Scott Rhodes, Sharpsburg, GA (US); William Thomas Hopkins, Newnan, GA (US)

(73) Assignee: Cooper Technologies Company, Houston, TX (US)

( * ) Notice: Subject to any disclaimer, the term of this patent is extended or adjusted under 35 U.S.C. 154(b) by 320 days.

(21) Appl. No.: 12/785,981

(22) Filed: May 24, 2010

(51) Int. Cl.
*H05B 37/02* (2006.01)

(52) U.S. Cl.
USPC ............................ 315/291; 315/297; 315/307

(58) Field of Classification Search
USPC ................ 315/219, 224, 247, 276, 291, 297, 315/307, 360, DIG. 4
See application file for complete search history.

(56) References Cited

U.S. PATENT DOCUMENTS

| | | | | |
|---|---|---|---|---|
| 6,448,713 | B1 * | 9/2002 | Farkas et al. | 315/291 |
| 6,642,669 | B1 * | 11/2003 | MacAdam et al. | 315/244 |
| 7,321,202 | B2 * | 1/2008 | Chitta | 315/224 |
| 7,777,423 | B2 * | 8/2010 | Fischer et al. | 315/224 |
| 8,049,432 | B2 * | 11/2011 | Taipale et al. | 315/282 |
| 2011/0080110 | A1 * | 4/2011 | Nuhfer et al. | 315/291 |
| 2011/0101867 | A1 * | 5/2011 | Wang et al. | 315/127 |

* cited by examiner

*Primary Examiner* — Tung X Le
(74) *Attorney, Agent, or Firm* — King & Spalding LLP

(57) ABSTRACT

A circuit for dimming a lamp is provided. The circuit includes a triac dimmer that adjusts the voltage level of an input AC waveform based on the setting of a dimmer switch. The output of the dimmer is provided to a power supply circuit that drives the lamp based on the voltage level at the dimmer output. The power supply circuit includes a compensation circuit that compensates for loss of dimmer output signal caused by the triac when the dimmer switch is adjusted for full output. The compensation circuit is configured to engage at dimmer output voltage levels between full power supply voltage and a voltage threshold. The voltage threshold may be based on the dimmer output voltage level when the dimmer switch is set for full output. The compensation circuit essentially disengages to allow the lamp to dim when the dimmer output voltage level falls below the threshold.

19 Claims, 2 Drawing Sheets

LAMP DRIVER WITH TRIAC DIMMER COMPENSATION

TECHNICAL FIELD

The invention relates generally to lighting and more particularly to methods, systems, and apparatus for compensating for loss of full output energy provided to lamps caused by a triac dimmer.

BACKGROUND

Dimmers, typically in the form of dimmer switches, are devices used to vary the intensity of light output by one or more lamps. Conventional dimmer switches typically vary the intensity of light output by increasing or decreasing the root-mean-square ("RMS") voltage, and hence the mean power, provided to the lamp. To adjust the RMS voltage, conventional dimmers cut off either the leading edge or the trailing edge of an alternating current ("AC") input sinusoid. The intensity of the light output is determined by the proportion of the AC input sinusoid that is applied across the lamp. The portion that is cut off is commonly referred to as the dead time.

One common dimmer design employs a triac for cutting off a portion of one of the edges of the AC input sinusoid. Specifically, when a triac is electrically coupled to an AC source, the triac blocks the flow of current until the triac is triggered. A typical triac dimmer uses a gating circuit having a variable resistor, capacitor, and a diac. The triac is triggered when the voltage level of the capacitor charges to the nominal voltage of the diac, typically about 30 volts. The time for the capacitor to charge to the trigger point is set by the capacitance of the capacitor and the resistance of the variable resistor, such that a low resistance decreases the dead time (e.g., bright mode) and a high resistance increases the dead time (e.g., dim mode). The resistance of the resistor is controlled by a dimmer switch (e.g., slider switch or rotary switch). That is, the setting of the dimmer switch controls the amount of resistance of the variable resistor in the gating circuit. Once triggered, the triac continues to allow current to flow until the current through the triac reaches a level of zero. In short, the triac cuts off the leading edge of the input AC sinusoid. As the dimmer switch moves such that the operator of the switch would expect a lamp attached to the dimmer switch to grow dimmer, the triac is triggered later in the cycle, and the portion of the sinusoid that is cut off increases. As the portion of the sinusoid that is cut off increases, the RMS voltage of the AC input delivered to the lamp decreases.

However, the resistance of the resistor must be kept above a certain level to avoid damage to the trigger circuit components. Furthermore, the resistor is charged from the power source voltage so the power source voltage must be a minimum of the trigger point voltage (e.g., 30 volts) before the trigger circuit can operate. This causes the dimmer to remove an initial portion of the AC input sinusoid supplied to the load even when the dimmer switch is set for full power output. Therefore, conventional triac dimmer switches are not capable of providing full output voltage to lamps even when the dimmer switch is adjusted to the full output position. That is, even when a conventional triac dimmer switch is adjusted for full output voltage, the dimmer switch still cuts off a portion of the AC input sinusoid, resulting in less than full output RMS voltage.

This results in inefficient lighting and can sometimes require additional lamps or employing lamps with a higher power rating to correct. This can be very costly, especially for high efficiency LED lighting. It is also undesirable to customers to increase the number of lamps or the power rating of each lamp in order to restore proper lighting.

This inability to provide full voltage output also presents a problem for lighting designers. Lighting designers typically design lighting layouts based on manufacturer specifications that indicate total lumen output for a lamp or light fixture. However, if the lighting designer plans to install a triac dimmer circuit for the lamp or fixture, the designer is going to get a portion of the rated output only, resulting in inadequate illuminance on the illuminated object.

SUMMARY

The present invention can provide a compensation circuit that compensates for loss of full output energy provided to a lamp caused by a triac dimmer's failure to output full power source voltage.

One aspect of the present invention provides a system for dimming a lamp. The system can include a dimmer. The dimmer can receive an input voltage and adjust the input voltage. A power supply circuit can deliver a current to the lamp. A dimmer compensation circuit can increase the amount of current delivered to the lamp when the adjusted input voltage exceeds a threshold.

Another aspect of the present invention provides a method for dimming a lamp via a triac dimming circuit. The method can include receiving an indication of a desired light level at the triac dimming circuit. The triac dimming circuit can adjust an input voltage based on the indication of desired light. The adjusted input voltage can be provided to a control circuit. The control circuit can determine whether the adjusted input voltage exceeds a threshold voltage. In response to a positive determination that the adjusted input voltage exceeds the threshold voltage, the control circuit can increase an amount of current provided to the lamp.

Another aspect of the present invention provides a dimmable driver circuit for a lamp. The circuit can include an input voltage including an alternating current that is delivered to the lamp. A control circuit can be configured to monitor the input voltage. The control circuit can be further configured to deliver a current to the lamp. The current delivered to the lamp can be proportional to the input voltage. A dimmer compensation circuit can be electrically coupled to the control circuit and configured to adjust the magnitude of the current delivered to the lamp in response to the input voltage exceeding the threshold.

Another aspect of the present invention provides a system for dimming a lamp. The system can include a dimmer that receives an input voltage and adjusts the input voltage. A power supply circuit can deliver a current to a lamp. A dimmer compensation circuit can increase the amount of current delivered to the lamp when an amount of dead time associated with the adjusted input voltage falls below a threshold.

Another aspect of the present invention provides a method for dimming a lamp via a triac dimming circuit. This method can include receiving an indication of a desired light level at the triac dimming circuit. The triac dimming circuit can adjust a dead time of the input voltage based on the indication of desired light to generate an adjusted input voltage. The adjusted input voltage can be provided to a control circuit. The control circuit can determine whether the dead time falls below a threshold. In response to a positive determination that the dead time falls below the threshold, current provided to the lamp can be increased.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which.

Figure 1:
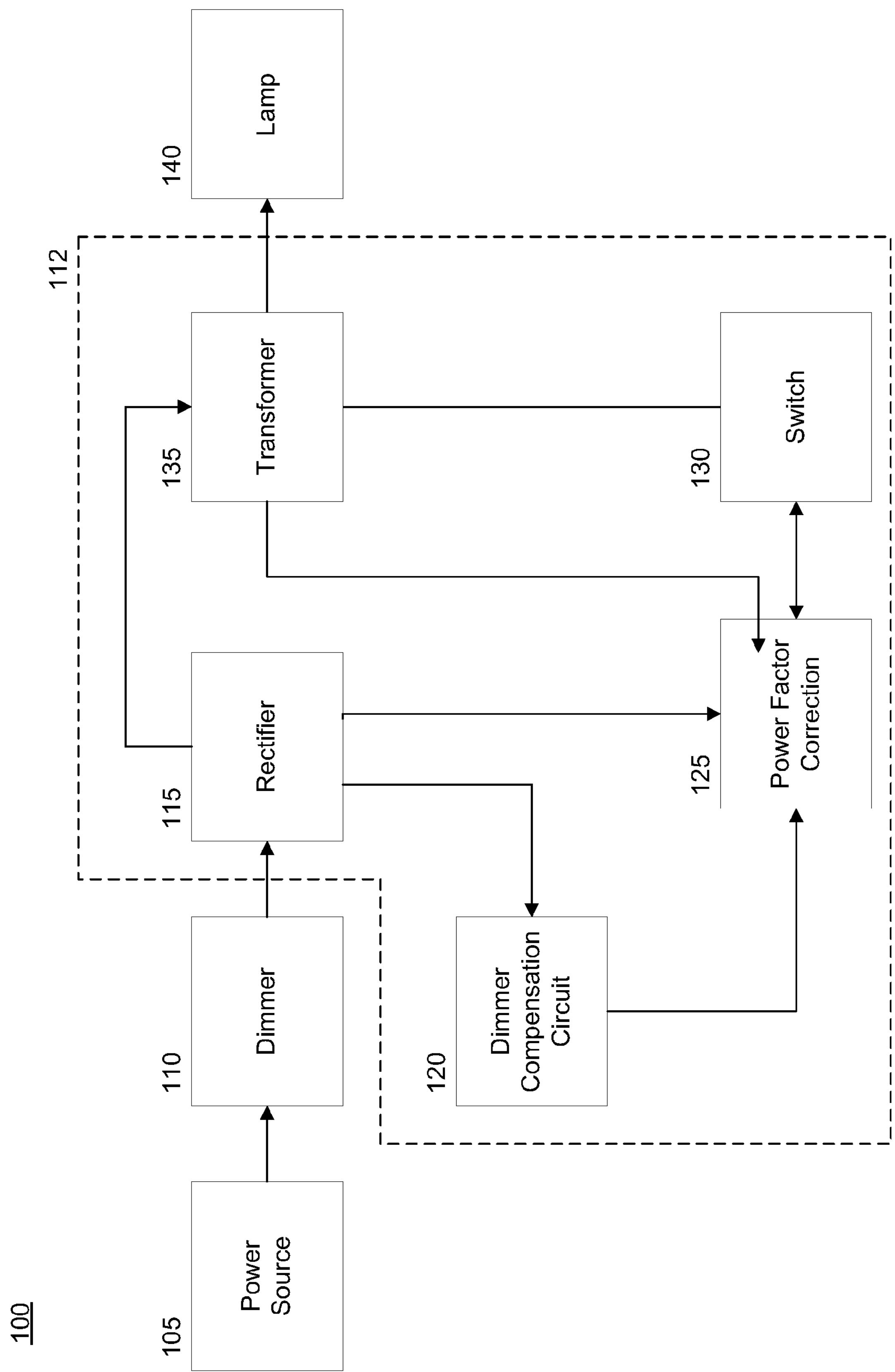
FIG. 1 is a block diagram depicting a dimmer circuit capable of providing full output energy to a lamp, in accordance with certain exemplary embodiments.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION OF EXEMPLARY EMBODIMENTS

Referring now to the figures, in which like numerals represent like (but not necessarily identical) elements throughout the figures, exemplary embodiments of the present invention are described in detail. FIG. 1 is a block diagram depicting a dimmer circuit 100 capable of providing full output energy to a lamp 140, in accordance with certain exemplary embodiments. Referring now to FIG. 1, the exemplary dimmer circuit 100 includes a power source 105 for providing power to a lamp 140. The lamp 140 may include, but it not limited to, a light emitting diode ("LED"), a fluorescent lamp, a compact fluorescent ("CFL") lamp, a high intensity discharge lamp, or a low voltage halogen lamp. In certain exemplary embodiments, the power source 105 provides an alternating current ("AC") input. For example, the power source 105 provides a standard United States voltage of 120 volts ("Vrms") at 60 hertz ("Hz"). Alternatively, the power source 105 provides other AC input voltages, including 240V at 60 Hz in North America, 230V at 50 Hz in Europe, or 400V at 50 Hz, also in Europe.

The power source 105 is electrically coupled to a dimmer 110 having an adjustable dimmer switch (e.g., slider switch or rotary switch) by way of electrical conductors. In this exemplary embodiment, the dimmer 110 includes a triac dimmer switch (not shown) that functions to clip a portion of the AC input sinusoid received from the power source 105. Specifically, when a triac is electrically coupled to an AC source, the triac blocks the flow of current until the triac is triggered. The triac is triggered by applying a sufficient voltage level to its gate electrode. This voltage at the gate electrode is controlled by a variable resistor which is controlled by the adjustable dimmer switch. That is, the setting of the dimmer switch controls the amount of resistance at the gate electrode, and thus the voltage level at the gate electrode. Once triggered, the triac continues to allow current to flow until the current through the triac reaches a level of zero. In short, the triac cuts off the leading edge of the input AC sinusoid provided by the power source 105. As the dimmer switch moves such that the operator of the switch would expect a lamp attached to the dimmer switch to grow dimmer, the triac is triggered later in the cycle, and the portion of the sinusoid that is cut off increases. As the portion of the sinusoid that is cut off increases, the RMS voltage at the output of the dimmer 110 decreases. Likewise, as the portion of the sinusoid that is cut off decreases, the RMS voltage at the output of the dimmer 110 increases.

However, the triac does not allow the dimmer 110 to output full output voltage even when the dimmer switch is adjusted to full output. Instead, when a triac dimmer switch is adjusted for full output voltage, the dimmer switch still cuts off a portion of the AC input sinusoid, resulting in less than full output RMS voltage. In certain alternative exemplary embodiments, the dimmer includes another type of phase control dimmer that exhibits this inability to output full output voltage in the full output position. For example, the dimmer 110 may include an electronic low voltage dimmer that cuts off the trailing edge of an AC input sinusoid but still results in reduced output when set for full bright output.

The output of the dimmer 110 is passed to a power supply circuit 112 (or driver circuit) that drives the lamp 140 according to the voltage level of the AC waveform output by the dimmer 110. In certain exemplary embodiments, the power supply circuit 112 controls the amount of electrical current provided to the lamp 140 based upon the dimmer output voltage level. In certain exemplary embodiments, the power supply circuit 112 controls the voltage provided to the lamp 140 based upon the dimmer output voltage level. In one exemplary embodiment, the power supply circuit 112 drives the lamp 140 at full output energy when the voltage level of the AC waveform output by the dimmer 110 is at full output voltage (e.g., 120 Vrms). However, because the dimmer 110 is not capable of providing a full power source output voltage, a conventional power supply connected to such a dimmer 110 would provide less than full energy to the lamp 140 even when the dimmer switch is adjusted for full dimmer output voltage. That is, when the dimmer 110 is set for full output voltage (e.g., bright mode) the dimmer 110 provides a reduce voltage signal to the power supply circuit 112 and the power supply circuit 112, in turn, provides reduced output energy to the lamp 140.

In certain exemplary embodiments, the power supply circuit 112 includes (or is electrically coupled to) a compensation circuit 120 designed to compensate for this full output voltage deficiency of the dimmer 110. In certain exemplary embodiments, the dimmer compensation circuit 120 causes the power supply circuit 112 to provide the same amount of energy to the lamp 140 for dimmer output voltage levels at or above a threshold as the power supply circuit 112 would provide for a voltage level at full power source voltage. For example, if a triac dimmer switch is known to reduce the full output voltage by 2% in a full output position, the threshold is set at 98% of full power source output voltage (e.g., 98% of 120 Vrms or ~118 Vrms). In this example, if the dimmer output voltage is at or above 98% of full power source voltage, then the dimmer compensation circuit 120 causes the power supply circuit 112 to provide the same amount of energy to the lamp 140 that would be provided if the dimmer output voltage was at full power source voltage. If the dimmer output voltage is below 98% of full power source voltage, the dimmer compensation circuit disengages and allows the dimmer output voltage to control the amount of energy that the power supply circuit 112 provides to the lamp 140. Thus, for dimmer output voltages below the threshold, the lamp 140 is dimmed according to the dimmer output voltage. In certain exemplary embodiments, the threshold used by the dimmer compensation circuit 120 is set by a reference voltage and/or a gain of an amplifier of the dimmer compensation circuit 120 as described below with reference to FIG. 2.

The power supply circuit 112 also includes a full-wave rectifier circuit 115 that receives the AC waveform output from the dimmer 110. The exemplary full-wave rectifier 115 converts the AC waveform output by the dimmer 110 into a single waveform having a single polarity. In an exemplary embodiment, the output of the rectifier 115 is a signal that has the negative portion of the AC sine wave inverted. In an alternative exemplary embodiment, the rectifier 115 is a half-wave rectifier, which passes the positive portion of the AC sine wave, and blocks the negative portion of the AC sine wave. As the dimmer switch moves such that the operator of the switch would expect the attached light to grow dimmer, the average voltage on the output of the rectifier 115 will decrease.

In this exemplary embodiment, the power supply circuit 112 also includes a Power Factor Correction Circuitry ("PFC") 125 electrically coupled to the output of the rectifier 115. The PFC 125 is circuitry designed to control a switch-mode power supply and make corrections to the energy input into a load based on variations in the load. In an exemplary embodiment, the PFC 125 is packaged into an integrated circuit. Conventionally, the PFC 125 monitors the input voltage level from the dimmer 110 (via the rectifier 115) and the electrical current through the lamp 140. Based on those values, the PFC 125 controls input current to a flyback transformer 135 that provides current to the lamp 140. Although a flyback transformer 135 is used in this exemplary embodiment, other types of transformers may also be used in the circuit 100 as would be readily understood by a person of ordinary skill in the art having the benefit of the present disclosure. Conventionally, the PFC 125 controls current input to the flyback transformer 135 by opening a switch 130 when the current through the switch 130 exceeds a predetermined value determined from the rectified AC input and the output of a compensation network. The conventional predetermined value is a function of the difference between the actual lamp voltage and a desired lamp voltage, which is the average error. The desired lamp voltage is determined by the voltage level output of the dimmer 110, which (in this triac dimmer switch embodiment) is less than full output even when the dimmer switch is adjusted to provide full output voltage. The actual lamp voltage is determined by the amount of current provided from the power source 105 to the lamp 140 by the PFC 125.

Conventionally, when the switch 130 current exceeds that predetermined value, the PFC 125 opens the switch 130 and prevents the flyback transformer 135 from storing additional energy, thereby sending the energy stored in the flyback transformer 135 across the flyback transformer's secondary winding such that the energy is available to the lamp 140. Once the current through the flyback transformer 135 reaches zero indicating all of the stored energy has been transferred to the lamp 140, the PFC 125 closes the switch 130, thereby allowing the power source 105 to source current into the flyback transformer 135, thus allowing additional energy into the flyback transformer 135. Accordingly, the conventional applications of the PFC 125 cause the current through the lamp 140 to remain at the value determined by the output of the PFC's compensation network. That is, the output of the PFC's compensation network controls the amount of current, and thus the amount of energy, delivered to the lamp 140.

In certain exemplary embodiments, the dimmer compensation circuit 120 adjusts the output of the PFC's compensation network such that the PFC 125 concludes that the lamp 140 should be provided full energy for dimmer output voltage levels above a threshold. In certain exemplary embodiments, this threshold is set below the full output voltage of the power source 105 to compensate for the portion of the AC sinusoid that the dimmer 110 chops off when the dimmer switch is adjusted for full output. In one example, a triac dimmer 110 chops off approximately 2% of the AC sinusoid provided by the power source 105. In this example, the threshold is set such that the PFC 125 drives the lamp 140 at full output energy for dimmer output voltages at or above 98% full power source output voltage.

Figure 2:
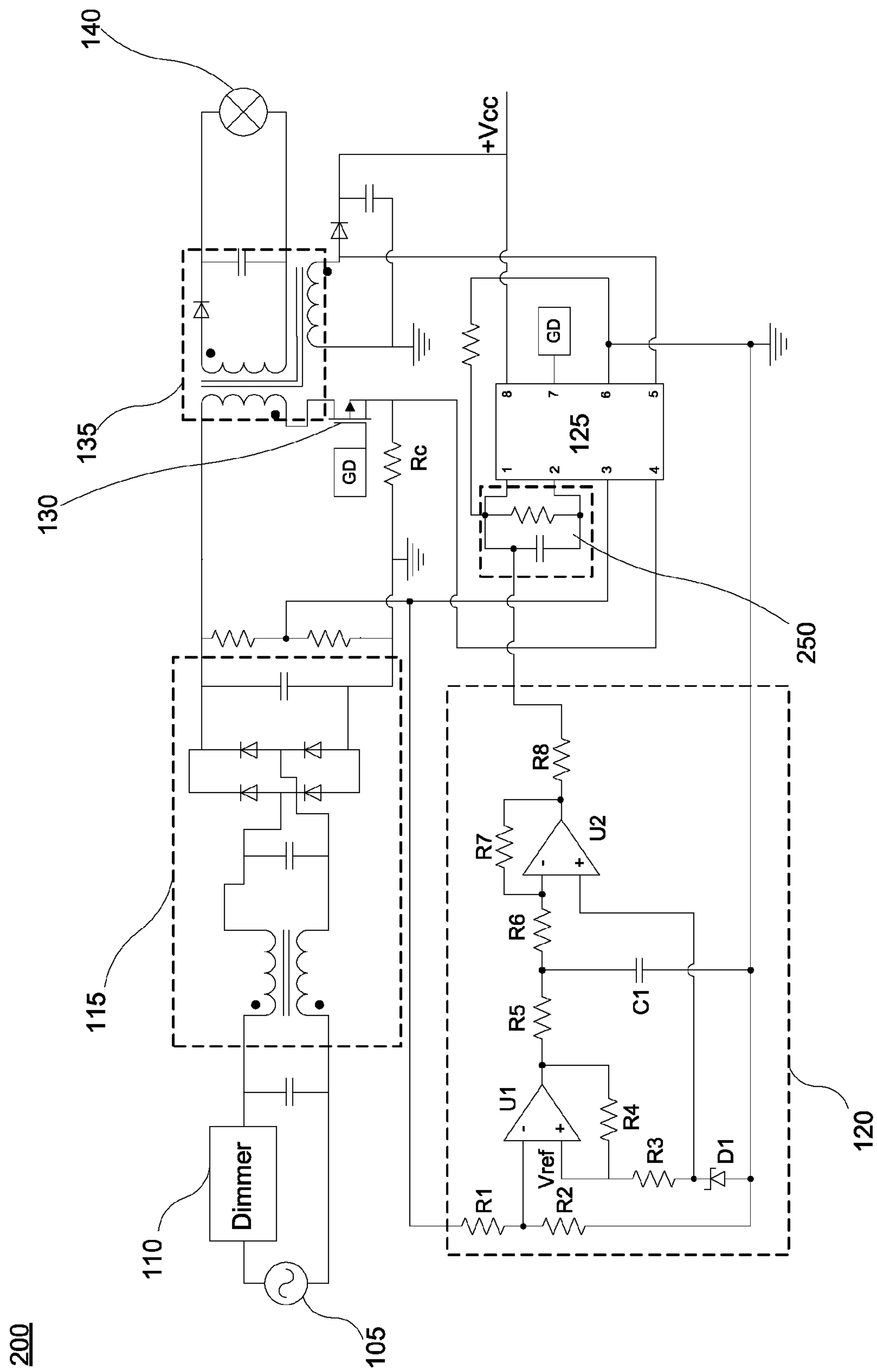
FIG. 2 is a circuit diagram of a compensation circuit implementing the block diagram of FIG. 1, in accordance with certain exemplary embodiments.

Turning now to FIG. 2, a circuit diagram of a dimmer circuit 200 implementing an exemplary embodiment of the present invention is shown. FIG. 2 is described with reference to FIG. 1. Furthermore, it is noted that while FIG. 2 describes a complete circuit for implementing an exemplary embodiment of the present invention, unless specifically set forth herein, the individual values of the circuit's components are not disclosed. The circuit 200 is designed to be used with a variety of AC inputs and loads, and with a variety of power factor correction circuits. The circuit 200 may be used with various types of lamps, including LEDs, fluorescent lamps, CFLs, high intensity discharge lamps, and low voltage halogen lamps to name a few. Depending on the combination of components chosen for a particular application, the values of individual components used to implement the circuit 200 may change without departing from the scope and spirit of the present invention. Further, the circuit 200 provided in FIG. 2 is an exemplary implementation of an embodiment of the present invention. It would be within the capabilities of a person having ordinary skill in the art to replace one or more components with a functional equivalent without departing from the scope and spirit of the present invention. For example, various other circuits capable of driving a load based on voltage level input may replace the PFC in certain alternative exemplary embodiments.

The power source 105 provides an AC input waveform to the dimmer 110. The dimmer 110 adjusts the AC waveform based on the position of the dimmer switch. The adjusted AC waveform output by the dimmer 110 is passed to the rectifier 115. The rectifier 115 converts the adjusted AC waveform into a waveform having a single polarity. In this exemplary embodiment, the output of the rectifier 115 is the sinusoid of the AC waveform, with the polarity of the negative portion of the sine wave inverted.

The output of the rectifier 115 is passed to the primary winding of the flyback transformer 135, so long as the switch 130 is closed (or otherwise positioned to allow current to flow therethrough). When the switch 130 opens, energy in the magnetic core of the flyback transformer 135 drains through the secondary winding of the flyback transformer 135 and is stored in the bulk capacitance such that the energy will be available to illuminate the lamp 140.

The output of the rectifier 115 is also passed to the PFC 125. In certain exemplary embodiments, the PFC 125 is an L6562 Transition-Mode PFC Controller, manufactured by STMicroelectronics. In certain alternative exemplary embodiments, the PFC 125 is a critical conduction mode ("CCM") power factor correction boost controller, such as the Infineon TDA4863 or the Fairchild FAN7527. In yet another exemplary embodiment, the PFC 125 can be any circuitry that is capable of monitoring a voltage and opening and closing a switch in response to that voltage exceeding a threshold.

In certain exemplary embodiments, the PFC 125 monitors several signals within the circuit 200. For example, the PFC 125 monitors the voltage across resistor Rc connected in series with the switch 130. As such, the PFC 125 is aware of the instantaneous current through the switch 130 at any time. When the voltage across Rc exceeds a predetermined threshold, the PFC 125 causes the switch 130 to open, thus preventing further current from the output of the dimmer 110 from passing through the flyback transformer 135. With current no longer flowing through the flyback transformer 135 primary winding, the energy in the flyback transformer core drains through the secondary winding, which induces a current through the lamp 140. As described above, this predetermined value is conventionally a function of the difference between the actual lamp voltage and a desired lamp voltage, which is the average error. However, the dimmer compensation circuit 120 is configured to modify this average error as described in detail below.

In certain exemplary embodiments, the output of the rectifier 115 is also divided down and passed to the dimmer compensation circuit 120. The output of the dimmer compensation circuit 120 is passed to the compensation network 250 of the PFC 125. The exemplary compensation network 250 includes a resistor and a capacitor connected across terminals 1 and 2 of the PFC 125. As discussed above, the dimmer compensation circuit 120 adjusts the output (i.e., to terminal 1) of the PFC's compensation network 250 such that the PFC 125 concludes that the lamp 140 should be powered at full output energy for dimmer output voltage levels above a threshold.

The dimmer compensation circuit 120 includes a voltage divider network of resistors R1 and R2. This voltage divider network reduces the voltage level from the output of the dimmer 110 to a level suitable for other components of the dimmer compensation circuit 120 and the PFC 125. The voltage level at the output of the voltage divider network (i.e., at the node between resistors R1 and R2) is directly proportional to the voltage level at the output of the dimmer 110, but lower in amplitude. In certain exemplary embodiments, this voltage divider network reduces a 0-120 Vrms input signal from the dimmer 110 to 0-5 Vrms.

The output of the voltage divider network is passed to an inverted input of operational amplifier voltage comparator U1. The comparator U1 compares the voltage level at the inverted input to a reference voltage Vref provided to the noninverted input. In this configuration, the comparator U1 outputs a "low signal" (~0 volts) when the voltage level output by the voltage divider network is higher than Vref and outputs a "high signal" (e.g., ~10 volts) when the voltage level output by the voltage divider network is lower than Vref. In essence, this creates a square waveform or a series of pulses at the output of the comparator U1 as long as the voltage level at the output of the voltage divider network cycles above and below Vref. The combination of the voltage divider network and the comparator U1 essentially detect the dead time of the signal output by the dimmer 110. This combination results in periodic pulses of a specific amplitude (e.g., 10 volts) on the output of the comparator U1 that is approximately equal to the dead time of the incoming AC sinusoid.

An RC circuit of resistor R5 and capacitor C1 integrate the pulses on the output of the comparator U1 to develop a direct current ("DC") voltage that is directly proportional to the duty factor of the pluses at the output of comparator U2. That is, this RC network converts the signal output by the comparator U1 to a DC signal having a voltage level that is the average of the voltage level at the output of the comparator U1. As the voltage level at the output of the comparator U1 is one of two values (e.g., 0 or 10 volts), this average voltage level is determined by the width between pulses in the comparator's output signal. Greater widths between pulses result in lower average voltage levels. Thus, this average voltage level is directly proportional to the amount of dead time (i.e., portion of the AC waveform cut off by the triac dimmer) in the original AC waveform output by the dimmer 110. The average voltage can be calculated by multiplying the peak voltage level of pulses output by the comparator U1 by the ratio of the duty factor of that signal when it is high to the total period of that signal. In essence, the DC signal output by the RC has a voltage level proportional the amount of dimming desired for the lamp 140. Higher voltage levels correspond to more dimming, while lower voltage levels correspond to less dimming (i.e., brighter lamp output).

The average voltage signal is sensed by resistors R6 and R7 and the inverting input of a second op-amp U2. In the illustrated configuration, the op-amp U2 has a gain equal to the negative of the resistance of R7 divided by the resistance of R6. For example, if the resistance of R7 is twice that of R6, then the gain of the op-amp U2 is −2. The output of the op-amp U2 is electrically coupled to the compensation network of the PFC 125. In this exemplary embodiment, the output of the op-amp U2 is electrically coupled to terminal 1 of the PFC 125.

Terminal 1 of the PFC 125 is connected to the inventing input of an operational amplifier ("op-amp") internal to the PFC 125 and the non-inverting input of this internal op-amp is connected to a preset voltage. In certain exemplary embodiments, this preset voltage is 2.5 volts. The circuit 100 includes a feedback network including a resistor between terminals 1 and 2 and another resistor between terminals 1 and 6. This feedback network acts to maintain a voltage on pin 1 of 2.5 volts, equal to that of the non-inverting input of the internal op-amp. In this configuration, the voltage on terminal 2 will change in response to various operating conditions in order to maintain a level of 2.5 volts at terminal 1.

The dimmer compensation circuit 120 is configured such that, when a dimmer 110 is not connected between the power source 105 and the power supply circuit 112, the output of op-amp U2 does not affect the voltage level at terminal 1. That is, the dimmer compensation circuit 120 is configured such that the output of op-amp U2 is equal to the internal op-amp's preset voltage (e.g., 2.5 volts) so that essentially no current flows in resistor R8, resulting in minimal effect on the PFC 125. During this mode of operation, there is little or no dead time to be detected by resistors R1, R2 and the comparator U1. Therefore, the voltage on capacitor C1 is essentially zero volts. The value of Vref, and the values for R6 and R7 are selected to provide a voltage equal to the internal op-amp's preset voltage (e.g., 2.5 volts) on the output of op-amp U2 when the voltage of C1 is zero volts. This provides an output of 2.5 volts (internal op-amp's preset voltage) on the output of op-amp U2 and does not affect the operation of the PFC 125 when there is little or no dead time in the incoming voltage from the power source 105.

When a dimmer 110 is electrically coupled between the power source 112 and the power supply circuit 112 as illustrated in FIGS. 1 and 2, the output of op-amp U2 decreases as the amount of dead time at the output of the dimmer 110 increases. This results in some current flow from terminal 1 of the PFC 125 through resistor R8 to the output of op-amp U2, and thus a decrease in the voltage level at terminal 1. This decrease in voltage at terminal 1 results in an increase in the average error detected by the PFC 125. The internal op-amp of the PFC 125 circuit responds by increasing the output voltage on terminal 2 until the 2.5 volts (internal op-amp's preset voltage) is restored on terminal 1. This increase in voltage on terminal 2, in turn, increases the level of current that flows in switch 130 and sensed by Rc. This, in turn, increases the amount of current provided to the lamp 140 and restores full light output.

The dimmer compensation circuit 120 is configured to essentially disengage after the amount of dead time exceeds a dead time threshold and thus the RMS voltage output by the dimmer 110 drops below a corresponding voltage threshold. That is, when the amount of dead time detected by the dimmer compensation circuit 120 exceeds the dead time threshold, the dimmer compensation circuit 120 stops affecting the voltage level at terminal 1 of the PFC 125 and thus, allows the PFC 125 to reduce the amount of current supplied to the lamp 140. In certain exemplary embodiments, this dead time threshold is selected to match the amount of the AC input sinusoid that the triac dimmer cuts off when positioned for full output voltage (i.e., full bright mode). That is, the dead time threshold may be selected to match the amount of dead time caused by the triac dimmer when the triac dimmer is adjusted for full output voltage.

In the illustrated embodiment of FIG. 2, the dimmer compensation circuit 120 effectively disengages when the DC voltage on the capacitor C1 increases to a voltage equal to Vref. When the DC voltage on capacitor C1 increases to Vref, the output of op-amp U2 responds by going to approximately zero volts. As the voltage at the output of op-amp U2 can not drop below zero volts, this is the output of op-amp U2 can not further affect the voltage on terminal 1 of the PFC 125. Therefore, as the dimmer switch moves such that the operator of the switch would expect the lamp 140 attached to the dimmer switch to grow dimmer, the dimmer compensation circuit 120 does not further increase the amount of current supplied to the lamp 140. The amount of current supplied to the lamp 140 then decreases in proportion to the reduction in AC line voltage output by the dimmer 110 as determined by the dimmer switch setting. Thus, normal dimming function is achieved without sacrificing light output when the dimmer switch is adjusted to the full bright setting.

In certain exemplary embodiments, the dead time threshold is determined by Vref and the gain of op-amp U2. For example, a higher Vref results in a higher threshold for the dimmer output voltage level to exceed before the dimmer compensation circuit 120 engages. Thus, a higher Vref is capable of being used with triacs that chop off smaller portions of the AC waveform when the dimmer switch is adjusted for full output. Also, a higher gain for op-amp U2 results in a higher threshold for engaging the dimmer compensation circuit 120.

In certain exemplary embodiments, the dimmer compensation circuit 120 is configured such that the circuit 120 engages to increase the average error of the PFC 125, and thus provide more current to the lamp 140, for dimmer output voltages above a threshold. In one example, this threshold is set to compensate for the amount of the AC signal chopped off by the triac dimmer switch when the dimmer switch is set for full output voltage. For dimmer output voltages above the threshold but below the full power source voltage level, the dimmer compensation circuit 120 increases the average error of the PFC 125 such that the PFC 125 concludes that the lamp 140 should be powered at full output energy. If the dimmer output is below the threshold, the dimmer compensation circuit 120 essentially disengages to allow the dimmer output voltage to control the amount of energy provided the lamp 140 and thus the intensity of the lamp 140.

The value of resistor R8 is selected to control the amount of compensation for a given amount of dead time to that sufficient compensation is achieved without overshooting. The amount of compensation varies directly with the amount of dead time so that smooth continuous light is produced by the lamp 140 without sudden changes or flashes. This is true when the amount of dead time is held steady (i.e., the dimmer switch remains in the same position) and when the dead time is varying (i.e., the dimmer switch is being adjusted).

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A system for dimming a lamp, comprising:

a dimmer that receives an input voltage and adjusts the input voltage;

a power supply circuit that delivers current to a lamp; and a dimmer compensation circuit configured to increase an amount of current delivered to the lamp for full output energy to the lamp, when the adjusted input voltage exceeds a threshold, wherein the dimmer compensation circuit comprises a voltage comparator that generates a series of pulses, each pulse being generated when the adjusted input voltage is less than a reference voltage, and the dimmer compensation circuit further comprises a voltage averaging circuit electrically coupled to an output of the voltage comparator, and the voltage averaging circuit outputs a direct current signal having a voltage level approximately equal to an average voltage of the series of pulses.

2. The system of claim 1, wherein the power supply circuit comprises a power factor correction circuit, and the dimmer compensation circuit further comprises an amplifier circuit electrically coupled to the voltage averaging circuit that amplifies the average voltage of the series of pulses and provides the amplified signal to the power factor correction circuit.

3. The system of claim 2, wherein the power factor correction circuit is configured to increase the amount of current delivered to the lamp based upon a voltage level of the amplified signal, when the adjusted input voltage exceeds the threshold.

4. The system of claim 1, wherein the dimmer comprises a triac dimmer switch.

5. The system of claim 1, wherein the lamp comprises one of a light emitting diode, a fluorescent lamp, a compact fluorescent lamp, and a low voltage halogen lamp.

6. A method for dimming a lamp via a triac dimming circuit, comprising:

receiving an input voltage at the triac dimming circuit from a power source;

adjusting, by the triac dimming circuit, the input voltage to provide an adjusted input voltage;

providing the adjusted input voltage to a control circuit;

determining, by the control circuit, whether the adjusted input voltage exceeds a threshold voltage;

in response to a determination that the adjusted input voltage exceeds the threshold voltage, increasing an amount of current provided to the lamp for full output energy to the lamp;

comparing the adjusted input voltage to a reference voltage;

generating a pulse each time the adjusted input voltage is less than the reference voltage; and generating a voltage average signal comprising a voltage level approximately equal to an average voltage of the series of pulses.

7. The method of claim 6, further comprising:

providing the average voltage signal to a power factor correction circuit;

adjusting an average error based on the average voltage signal; and adjusting, by the power factor correction circuit, the amount of current supplied to the lamp corresponding to the adjustment to the average error.

8. The method of claim 7, further comprising the step of amplifying the average voltage signal prior to providing the average voltage signal to the power factor correction circuit.

9. The method of claim 6, wherein the lamp comprises one of a light emitting diode, a fluorescent lamp, a compact fluorescent lamp, and a low voltage halogen lamp.

10. A dimmable driver circuit for a lamp, comprising:

a control circuit configured to monitor an input voltage and deliver a proportional current to the lamp based on the input voltage, in response to the input voltage exceeding a threshold; and a dimmer compensation circuit electrically coupled to the control circuit and configured to adjust a voltage on a control input of the control circuit, to increase the current delivered to the lamp beyond the proportional current in response to the input voltage exceeding the threshold.

11. The circuit of claim 10, wherein the lamp comprises a light emitting diode (LED) light source.

12. The circuit of claim 10, wherein the input voltage is received from a triac dimmer circuit operable to adjust a supply voltage provided by a power source.

13. The circuit of claim 12, wherein the dimmer compensation circuit increases the magnitude of the current delivered to the lamp to supply a full output voltage across the lamp in response to the input voltage exceeding the threshold.

14. The circuit of claim 10, wherein the dimmer compensation circuit comprises a voltage comparator that generates a series of pulses, each pulse being generated when the input voltage is less than a reference voltage.

15. The circuit of claim 14, wherein the dimmer compensation circuit further comprises a voltage averaging circuit electrically coupled to an output of the voltage comparator, and wherein the voltage averaging circuit is configured to output a direct current signal having a voltage level approximately equal to an average voltage of the series of pulses.

16. The circuit of claim 10, wherein the lamp comprises one of a light emitting diode, a fluorescent lamp, a compact fluorescent lamp, and a low voltage halogen lamp.

17. A dimmable circuit for a lamp, comprising:

a control circuit configured to monitor an input voltage and deliver a proportional current to the lamp based on the input voltage; and a dimmer compensation circuit electrically coupled to the control circuit and configured to adjust the magnitude of the current delivered to the lamp in response to the input voltage exceeding a threshold, wherein the dimmer compensation circuit comprises a voltage comparator that generates a series of pulses, each pulse being generated when the input voltage is less than a reference voltage, and the dimmer compensation circuit further comprises a voltage averaging circuit electrically coupled to an output of the voltage comparator and configured to output a direct current signal having a voltage level approximately equal to an average voltage of the series of pulses.

18. The circuit of claim 17, wherein the control circuit comprises a power factor correction circuit, and the dimmer compensation circuit further comprises an amplifier circuit electrically coupled to the voltage averaging circuit that amplifies the average voltage of the series of pulses to generate an amplified signal and provides the amplified signal to the power factor correction circuit.

19. The circuit of claim 18, wherein the power factor correction circuit adjusts the current delivered to the lamp based upon a voltage level of the amplified signal.

* * * * *